United States Patent
Ayabe et al.

(10) Patent No.: US 6,908,413 B2
(45) Date of Patent: Jun. 21, 2005

(54) DRIVING CONTROL APPARATUS FOR VEHICLE AND DRIVING CONTROL METHOD FOR VEHICLE

(75) Inventors: Atsushi Ayabe, Toyota (JP); Toshio Sugimura, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 71 days.

(21) Appl. No.: 10/690,575

(22) Filed: Oct. 23, 2003

(65) Prior Publication Data

US 2004/0102288 A1 May 27, 2004

(30) Foreign Application Priority Data

Nov. 21, 2002 (JP) ........................................ 2002-338531

(51) Int. Cl.$^7$ ........................ B60K 41/04; F16H 61/00
(52) U.S. Cl. ...................................... 477/109; 477/118
(58) Field of Search ............................. 477/109, 117–8, 477/140–1; 701/54

(56) References Cited

U.S. PATENT DOCUMENTS

| | | | | |
|---|---|---|---|---|
| 5,201,250 A | * | 4/1993 | Kato et al. ................. | 477/109 |
| 5,393,278 A | * | 2/1995 | Kyushima et al. .......... | 477/118 |
| 5,902,210 A | * | 5/1999 | Kobayashi et al. ......... | 477/118 |
| 6,090,008 A | * | 7/2000 | Hoshiya et al. ............. | 477/118 |
| 6,719,664 B2 | * | 4/2004 | Ito et al. ..................... | 477/176 |

FOREIGN PATENT DOCUMENTS

| | | | | |
|---|---|---|---|---|
| JP | 1-115738 | | 5/1989 | |
| JP | 401115739 A | * | 5/1989 | ................. 477/111 |
| JP | 9-53718 | | 2/1997 | |
| JP | 11-287317 | | 10/1999 | |

\* cited by examiner

*Primary Examiner*—Roger Pang
(74) *Attorney, Agent, or Firm*—Oblon, Spivak, McClelland, Maier & Neustadt, P.C.

(57) ABSTRACT

In the case where a signal for coasting time downshifting is output while fuel cut is performed and fuel supply is stopped, and a hydraulic pressure $P_{C1}$ of a low speed side frictional engagement device is being gradually increased and an engine speed NE is being increased, when the fuel cut is cancelled and the fuel supply is restarted, the hydraulic pressure $P_{C1}$ is reduced to a hydraulic pressure value immediately before an amount of torque is applied to the low speed side frictional engagement device.

12 Claims, 8 Drawing Sheets

FIG.2

| POSITION | | CLUTCH&BRAKE | | | | | | | O.W.C. | |
|---|---|---|---|---|---|---|---|---|---|---|
| | | C1 | C0 | C2 | B1 | B2 | C3 | B3 | F1 | F2 |
| N,P | | × | × | × | × | × | × | ○ | × | × |
| R | | × | × | ○ | × | ○ | × | ○ | × | × |
| D | 1ST | ○ | × | × | × | × | × | ○ | ○ | △ |
| D | 2ND | ○ | × | × | ○ | × | × | ○ | × | △ |
| D | 3RD | ○ | ○ | × | × | × | × | ○ | × | △ |
| D | 4TH | × | ○ | × | ○ | × | × | ○ | × | △ |
| D | 5TH | × | ○ | × | ○ | × | ○ | × | × | × |
| D | 1ST ENGINE BRAKE | ○ | × | × | × | ○ | × | ○ | △ | △ |

DRIVING CONTROL APPARATUS FOR VEHICLE AND DRIVING CONTROL METHOD FOR VEHICLE

INCORPORATION BY REFERENCE

The disclosure of Japanese Patent Application No. 2002-338531 filed on Nov. 21, 2002, including the specification, drawings and abstract is incorporated herein by reference in its entirety.

BACKGROUND OF THE INVENTION

1. Field of the Invention

The invention relates to a driving control for a vehicle and a driving control method for a vehicle. Particularly, the invention relates to downshift control at a coasting time.

2. Description of the Related Art

A driving control apparatus for a vehicle is known, which includes (a) an engine which generates power by fuel combustion, (b) a transmission which achieves plural speeds, gear ratios of which are different from each other, by changing engagement/disengagement states of plural frictional engagement devices, and (c) coasting time downshift control means for disengaging a high speed side frictional engagement device and applying torque to a low speed side frictional engagement device such that an engine speed is increased when downshifting of the transmission is automatically performed at a coasting time (for example, refer to Japanese Patent Laid-Open Publication No. 11-287317 (claim 6, and FIG. 7)). Also, a technology is widely employed, in which fuel supply to the engine is stopped (fuel cut is performed) for improving fuel economy when a predetermined fuel cut condition including a condition that the vehicle is coasting is satisfied (refer to Japanese Patent Laid-Open Publication No. 9-53718).

However, in the case where a signal for downshifting of the transmission is output while fuel cut is performed at the coasting time, and then the engine speed is being increased according to the control of torque of the low speed side frictional engagement device by the coasting time downshift control means, when fuel cut is cancelled, for example, due to the operation of auxiliaries such as an air conditioner and fuel supply is restarted, torque of an output shaft (driving torque of a vehicle) may be suddenly changed due to a decrease in a load of the engine (an engine brake force), which may cause a driver to feel uncomfortable. Particularly, since downshifting at the coasting time (hereinafter, refer to as coasting time downshifting) is automatically performed when the driver does not intend to change torque, the driver may feel a shock (a change in the torque) sensitively even if the shock is relatively small, which is inconvenient.

SUMMARY OF THE INVENTION

It is an object of the invention to prevent occurrence of a shock which causes a driver to feel uncomfortable when fuel cut is cancelled and fuel supply is restarted in the case where an engine speed is being increased according to an amount of torque of a low speed side frictional engagement device during downshifting in a fuel cut state at a coasting time.

A first aspect of the invention relates to a driving control apparatus for a vehicle including an engine, a transmission, a fuel cut control device, a transmission control device and a low speed side torque control device. The engine generates power by fuel combustion. The transmission achieves plural speeds, gear ratios of which are different from each other, by changing engagement/disengagement states of plural frictional engagement devices including a high speed side frictional engagement device and a low speed side frictional engagement device. The fuel cut control device performs fuel cut in which fuel supply to the engine is stopped when a predetermined fuel cut condition including a condition that the vehicle is coasting is satisfied. The transmission control device performs control for disengaging the high speed side frictional engagement device and applying an amount of torque to the low speed side frictional engagement device such that an engine speed is increased when downshifting of the transmission is automatically performed at a coasting time. The low speed side torque control device stops the control of torque of the low speed side frictional engagement device by the transmission control device so as to reduce the amount of torque of the low speed side frictional engagement device when the fuel cut by the fuel cut control device is cancelled and the fuel supply is restarted in a case where a signal for downshifting of the transmission is output while fuel supply is stopped by the fuel cut control device at the coasting time, and then the engine speed is being increased due to the control of torque of the low speed side frictional engagement device by the transmission control device.

In the driving control apparatus, the amount of torque of the low speed side frictional engagement device is reduced by the low speed side torque control device such that torque transmitted from the engine is reduced when the fuel cut by the fuel cut control device is cancelled and the fuel supply is restarted in the case where the signal for downshifting of the transmission is output while the fuel supply is stopped by the fuel cut control device at the coasting time, and then the engine speed is being increased according to the control of torque of the low speed side frictional engagement device by the transmission control device. Accordingly, a change in torque of an output shaft due to reoperation of the engine is suppressed, and driving comfort is improved.

The low speed side frictional engagement device is disengaged at a high speed side shift speed before downshifting, and is engaged at a low speed side shift speed achieved by downshifting. The high speed side frictional engagement device is engaged at the high speed side shift speed before downshifting, and is disengaged at the low speed side shift speed achieved by downshifting.

A second aspect of the invention relates to a driving control method of a vehicle. The method includes the steps of determining whether fuel cut is being performed; determining whether a signal for downshifting has been output when the vehicle is coasting; performing coasting time downshift control for disengaging a high speed side engagement device of a transmission and applying an amount of torque to a low speed side engagement device of the transmission such that an engine speed is increased when the signal for downshifting has been output; determining whether the fuel cut has been cancelled in the case where the engine speed is being increased by the coasting time downshift control based on the signal for downshifting which is output when the fuel cut is being performed and the vehicle is coasting; and reducing the amount of torque of the low speed side frictional engagement device when it is determined that the fuel cut has been cancelled.

As in the driving control apparatus according to the first aspect of the invention, a change in torque of an output shaft due to reoperation of the engine is suppressed, and driving comfort is improved.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 2 is a table showing relationships between combinations of operation states of plural hydraulic frictional engagement devices of an automatic transmission in FIG. 1, and shift speeds which are achieved by the combinations;

DETAILED DESCRIPTION OF THE PREFERRED EMBODIMENTS

Figure 1:
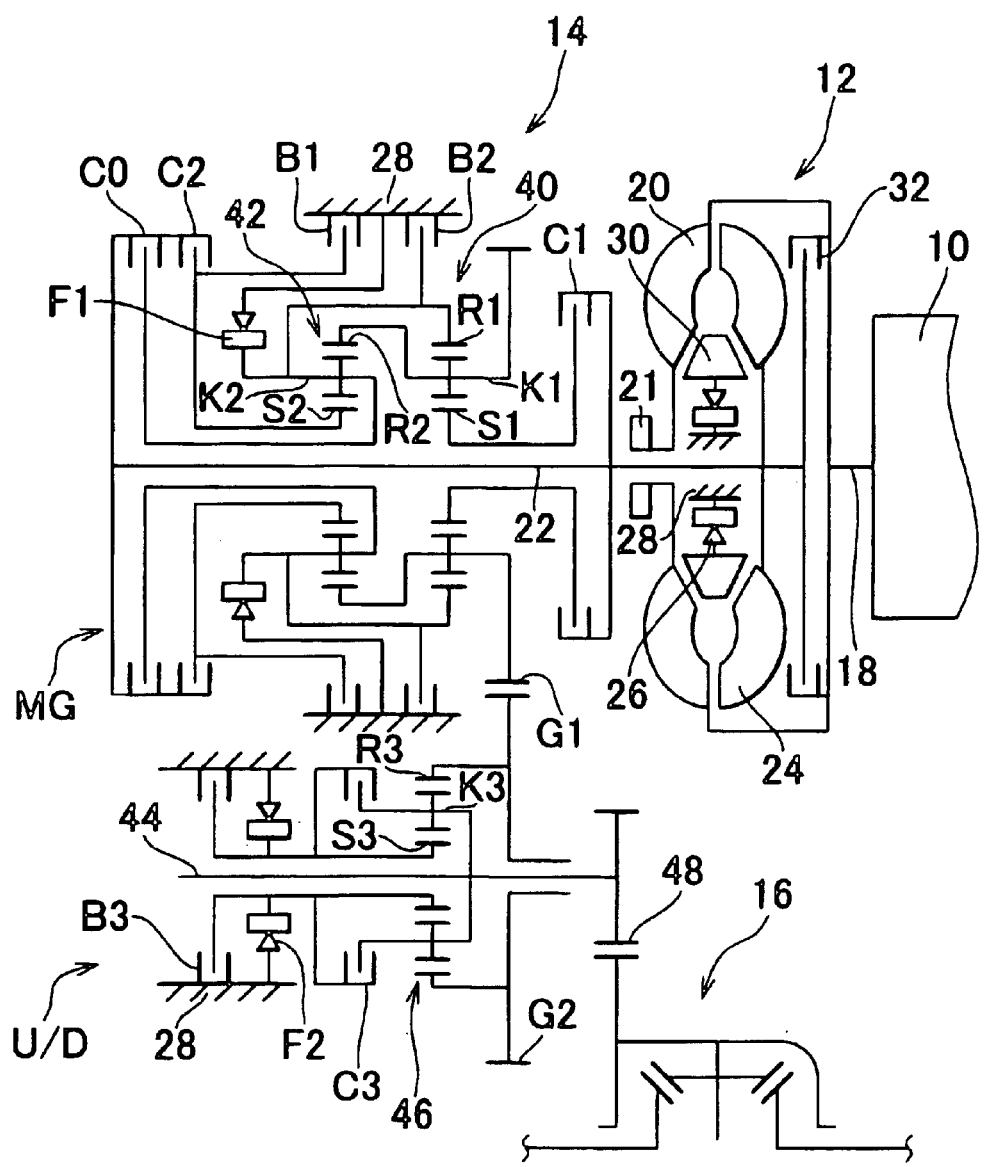
FIG. 1. is a schematic diagram describing a driving control apparatus for a vehicle of an embodiment of the invention.

A driving control apparatus for a vehicle of an embodiment of the invention is applied to a vehicle which includes an engine as a drive power source for running. However, the driving control apparatus may be applied to a hybrid vehicle or the like which includes another drive power source such as an electric motor in addition to an engine. The engine includes a fuel injector or the like which can automatically stops fuel supply using fuel cut means. As a throttle valve which adjusts an intake air amount, an electronic throttle valve is preferably used which can be electrically controlled to be opened/closed. However, a throttle valve may be used which is mechanically controlled to be opened/closed according to an accelerator operation performed by a driver (an output request).

The coasting time signifies a time when a vehicle is coasting while an output amount required by a driver is 0, that is, an accelerator operation amount is 0 (an accelerator pedal is not depressed), and a throttle valve is substantially fully closed, irrespective of whether brake operation is performed or not. The opening of the throttle valve may be minimum opening, and an amount of air flowing through the throttle valve may be completely 0. For example, in the case where a bypass passage including an idle speed control valve (i.e., an ISC valve) is provided, the amount of air flowing through the throttle valve may be completely 0. However, in the case where the bypass passage is not provided, the opening of the throttle valve is determined such that a certain amount of air which makes the engine operate by itself in a predetermined idle state is allowed to pass through the throttle valve. Also, the opening of the throttle valve may be electrically controlled such that engine is brought into a predetermined idle state.

As a transmission, for example, an automatic transmission of a planetary gear type is preferably employed in which rotational elements of plural planetary gear devices are engaged/disengaged by a frictional engagement device such that plural forward shift speeds are achieved. The driving control apparatus performs downshifting by so-called clutch-to-clutch shifting, that is, downshifting by disengaging a high speed side frictional engagement device and engaging a low speed side frictional engagement device. Various types of transmissions can be employed in which downshifting is performed by disengaging one of a pair of frictional engagement devices and engaging the other. For example, a biaxial type gear mesh transmission which performs downshifting by changing states of plural input clutches (frictional engagement devices) can be employed. As a frictional engagement device, for example, a hydraulic frictional engagement device is preferably employed which is engaged by a hydraulic actuator. In this case, an engagement state can be controlled by hydraulic control, for example, using duty control of a linear solenoid valve. However, a frictional engagement device can be employed which controls an engagement state using electromagnetic force or the like, instead of using the hydraulic pressure.

The transmission is configured such that a reverse input from a drive wheel side is transmitted to an engine side and an engine speed is increased. However, it is not necessary that the reverse input be transmitted at all the forward shift speeds. Various configurations may be employed such as a configuration in which a reverse input is transmitted at only part of the forward shift speeds on the high speed side, and a configuration in which a reverse input is transmitted only in a given condition, for example, only in a sport mode.

The transmission is configured such that plural forward shift speeds can be automatically selected using operation states such as a vehicle speed and a throttle valve opening as parameters. A vehicle speed during coasting time downshifting (hereinafter, referrer to as a "coasting-downshifting time vehicle speed") is set for each forward shift speed such that fuel cut is continuously performed. More particularly, the coasting-downshifting time vehicle speed is set according to a fuel supply return speed and a gear ratio of each forward shift speed such that downshifting is performed before the engine speed reaches the fuel supply return speed, and the engine speed is increased due to the downshifting. The fuel supply return speed is an engine speed at which fuel cut is cancelled and fuel supply is restarted. For example, the fuel supply return speed is set to a speed approximately equal to an idle speed such that the engine can operate by itself immediately due to explosion.

It is desirable that a hydrodynamic power transmission device, which transmits power via fluid and includes a lockup clutch, such as a torque converter or a fluid coupling, be provided between the engine and the transmission. In this case, it is desirable to provide lockup engagement means for engaging (or slipping) a lockup clutch so as to increase the engine speed, in order to prevent, as much as possible, cancellation of fuel cut (stop of fuel supply) due to a decrease in the engine speed at the coasting time.

For example, the coasting time downshift control means is configured so as to gradually increase the amount of torque of the low speed side frictional engagement device such that the engine speed is smoothly increased, and to increase the amount of torque at a large changing rate such that the low speed side frictional engagement device is completely engaged when a progress degree of downshifting reaches a predetermined value, for example, when the input speed (the rotational speed of an input shaft 22, the engine speed or turbine speed) comes close to the synchronous speed after downshifting. It is desirable that the disengagement side frictional engagement device, that is, the high speed side frictional engagement device should be disengaged after a predetermined amount of torque is applied to the engagement side frictional engagement device, that is, the low speed side frictional engagement device, in order that the engine speed can be prevented from decreasing due to a neutral state of the transmission.

The low speed side torque reducing means is configured so as to reduce the amount of torque of the low speed side frictional engagement device to 0 such that the low speed side frictional engagement device is completely disengaged. However, various configurations may be employed. For example, the low speed side torque reducing means may be configured so as to reduce the amount of torque of the low speed side frictional engagement device by a predetermined amount or by a predetermined rate. Thus, a predetermined amount of torque may remain.

Also, the low speed side torque reducing means performs torque reducing control only at an inertia phase where the engine speed is increased based on the amount of torque applied to the low speed side frictional engagement device. However, the low speed side torque reducing means may stop disengaging the low speed side frictional engagement device when the progress degree of downshifting is equal to or higher than a predetermined value, since the engine may race when the low speed side frictional engagement device is disengaged in the case where downshifting has progressed and the input speed has come close to the synchronous speed after downshifting.

Hereinafter, the embodiment of the invention will be described with reference to the accompanying drawings. FIG. 1 is a block diagram showing a driving device for a transversely-mounted engine type of vehicle such as an FF (front engine front drive) vehicle. An output from an engine 10 such as a gasoline engine which generates power by fuel combustion is transmitted to a drive wheel (a front wheel) (not shown) via a torque converter 12, an automatic transmission 14 and a differential gear 16. The torque converter 12 is a hydrodynamic power transmission device which transmits power via fluid, and includes a pump impeller 20 coupled with a crank shaft 18 of the engine 10, a turbine runner 24 coupled with an input shaft 22 of the automatic transmission 14, a stator 30 fixed to a housing 28, that is a non-rotating member, via a one-way clutch 26, and a lockup clutch 32 which directly couples the crank shaft 18 with the input shaft 22 via a damper (not shown). A mechanical oil pump 21 such as a gear pump is coupled with the pump impeller 20, and is rotationally-driven with the pump impeller 20 by the engine 10 so as to generate a hydraulic pressure for shifting and lubrication.

The lockup clutch 32 is a hydraulic frictional clutch which is frictionally engaged due to a pressure difference $\Delta P$ between a hydraulic pressure in an engagement side oil chamber and a hydraulic pressure in a disengagement side oil chamber. When the lockup clutch 32 is completely engaged, the pump impeller 20 and the turbine runner 24 are integrally rotated. When the pressure difference $\Delta P$, that is, engagement torque, is feedback-controlled such that the lockup clutch 32 is engaged in a predetermined slip state, the turbine runner 24 can be rotated in accordance with the pump impeller 20 at a predetermined slip amount, for example, approximately 50 rpm at the time of driving. Meanwhile, the pump impeller 20 can be rotated in accordance with the turbine runner 24 at a predetermined slip amount, for example, approximately −50 rpm at the time of reverse input.

The automatic transmission 14 includes a pair of a first planetary gear device 40 and a second planetary gear device 42 of single pinion type; a set of third planetary gear device 46; and an output gear 48. The first planetary gear device 40 and the second planetary gear device 42 of single pinion type are provided coaxially on the input shaft 22, and form a planetary gear mechanism having a so-called CR-CR coupling configuration in which carriers and ring gears of planetary gear devices are mutually coupled. The set of third planetary gear device 46 is provided coaxially on a counter shaft 44 that is in parallel with the input shaft 22. The output gear 48 is fixed at an end of the counter shaft 44 and is engaged with the differential gear device 16. The components of each of the planetary gear devices 40, 42, 46, that are, a sun gear, the ring gear and the carrier which rotatably supports the pinion gears that are engaged with the sun gear and the ring gear are selectively coupled with each other by four clutches, C0, C1, C2, C3, or are selectively coupled with the housing 28, which is a non-rotating member, by three brakes B1, B2, B3. Also, the carrier K2 and the sun gear S3 are engaged with the housing 28 according to the rotation direction thereof by two one-way clutches F1, F2. Since the differential gear device 16 is configured so as to be symmetrical with respect to an axis line (an axle), the lower portion is omitted in FIG. 1.

A main shifting portion MG, which achieves four forward speeds and one reverse speed, includes a pair of the first planetary gear device 40 and the second planetary gear device 42, clutches C0, C1, C2, brakes B1, B2 and the one-way clutch F1, which are provided coaxially on the input shaft 22. A sub shifting portion, that is, an under drive portion U/D includes the set of planetary gear device 46, the clutch C3, the brake B3, and the one-way clutch F2, which are provided on the counter shaft 44. In the main shifting portion MG, the input shaft 22 is coupled with a carrier K2 of the second planetary gear device 42, a sun gear S1 of the first planetary gear device 40, a sun gear S2 of the second planetary gear device 42 via the clutches C0, C1, C2. A ring gear R1 of the first planetary gear device 40 and the carrier K2 of the second planetary gear device 42 are coupled with each other. A ring gear R2 of the second planetary gear device 42 and a carrier K1 of the first planetary gear device 40 are coupled with each other. The sun gear S2 of the second planetary gear device 42 is coupled with the housing 28, which is a non-rotating member, via the brake B1. The ring gear R1 of the first planetary gear device 40 is coupled with the housing 28, which is a non-rotating member, via the brake B2. A one-way clutch F1 is provided between the carrier K2 of the second planetary gear device 42 and the housing 28, which is a non-rotating member. A first counter gear G1 which is fixed to the carrier K1 of the first planetary gear device 40 and a second counter gear G2 which is fixed to a ring gear R3 of the third planetary gear device 46 are engaged with each other. In the under drive portion U/D, a carrier K3 and a sun gear S3 of the third planetary gear device 46 are coupled with each other via a clutch C3. The brake B3 and the one-way. clutch F2 are provided in parallel between the sun gear S3 and the housing 28, which is a non-rotating member.

The clutches C0, C1, C2, C3 and the brakes B1, B2, B3 (hereinafter, simply referred to as the clutch C, and the brake B unless they need to be distinguished from each other) are hydraulic frictional engagement devices such as a multiple disc clutch and a band brake, which are controlled to be engaged/disengaged by hydraulic actuators. When hydraulic circuits are switched by excitation/nonexcitation of linear solenoids SL1, SL2, SL3, SLT and solenoids DSL, S4, SR of a hydraulic control circuit 98 (refer to FIG. 3), or by a manual valve, the engagement/disengagement state is changed, for example, as shown in FIG. 2. The five forward speeds, the one reverse speed and neutral are achieved according to the position of a shift lever 72 (refer to FIG. 3). In FIG. 2, "1st" signifies the forward first speed. Similarly, "2nd" to "5th" signify the forward second to fifth speeds. A circle signifies engagement, an X signifies disengagement, and a triangle signifies engagement which is not related to power transmission. For example, the shift lever 72 is operated so as to be in one of a parking position "P", a reverse running position "R", a neutral position "N", forward running positions "D", "4", "3", "2", "L" according to a shift pattern shown in FIG. 4. In the positions "P" and "N", neutral is achieved as a non-driving shift speed for interrupting power transmission. In the position "P", rotation of the drive wheel is mechanically hindered by a mechanical parking brake (not shown).

In FIG. 2, in second speed to fifth speed, an engine brake is applied when a reverse input from the drive wheel side is transmitted to the engine 10 side. Shifting among these speeds is achieved by so-called clutch-to-clutch shifting which is performed by disengaging one of the two frictional engagement devices and engaging the other. For example, shifting from third speed to fourth speed is achieved by disengaging the clutch C1 and engaging the brake B1, and shifting from fourth speed to third speed is achieved by disengaging the brake B1 and engaging the clutch C1. Even in first speed, the engine brake is applied by engaging the brake B2. In this case, shifting between first speed and second speed is performed by clutch-to-clutch shifting.

Figure 3:
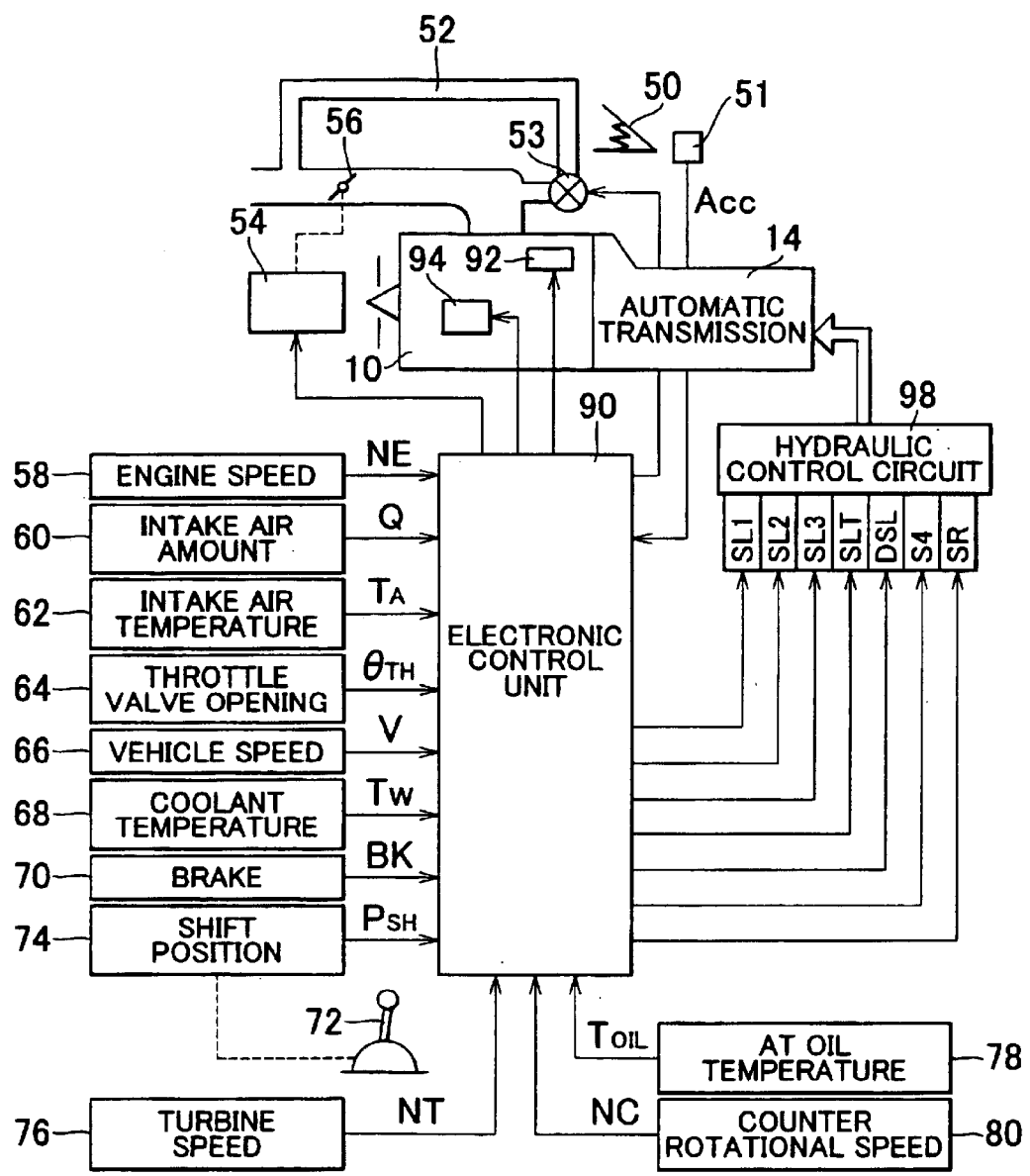
FIG. 3 is a block diagram showing a main portion of a control system included in the driving control apparatus in FIG. 1.
Figure 4:
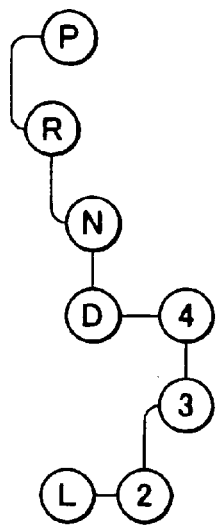
FIG. 4 is a diagram showing shift positions of a shift lever in FIG. 3.

FIG. 3 is a block diagram showing a control system provided in the vehicle in order to control the engine 10, the automatic transmission 14 and the like in FIG. 1. An operation amount Acc of an accelerator pedal 50 is detected by an accelerator operation amount sensor 51. The accelerator pedal 50 is depressed according to an output amount required by the driver. The accelerator pedal 50 corresponds to an accelerator operation member, and the accelerator pedal operation amount Acc corresponds to the required output amount. An electronic throttle valve 56 is provided in an intake pipe of the engine 10. The opening of the electronic throttle valve 56 is controlled by a throttle actuator 54 so as to be an opening $\theta_{TH}$ corresponding to the accelerator pedal operation amount Acc. An idle speed control valve (an ISC valve) 53 is provided in a bypass passage 52 for bypassing the electronic throttle valve 56 for idle speed control. The ISC valve 53 controls an intake air amount when the electronic throttle valve 56 is fully opened so as to control an idle speed $NE_{IDL}$ of the engine 10. In addition, there are provided an engine speed sensor 58 for detecting a speed NE of the engine 10, an intake air amount sensor 60 for detecting an intake air amount Q of the engine 10, an intake air temperature sensor 62 for detecting a temperature $T_A$ of the intake air, a throttle sensor 64 with an idle switch for detecting a fully closed state (an idle state) of the electronic throttle valve 56 and an opening $\theta_{TH}$ thereof, a vehicle speed sensor 66 for detecting a vehicle speed V (corresponding to a rotational speed $N_{OUT}$ of the counter shaft 44), a coolant temperature sensor 68 for detecting a coolant temperature $T_W$ for the engine 10, a brake switch 70 for detecting an operation of the brake, a shift position sensor 74 for detecting a shift position (an operation position) $P_{SH}$ of the shift lever 72, a turbine speed sensor 76 for detecting a turbine speed NT (i.e., a rotational speed $N_{IN}$ of the input shaft 22), an AT oil temperature sensor 78 for detecting an AT oil temperature $T_{OIL}$ which is a temperature of operating oil in the hydraulic control circuit 98, a counter rotational speed sensor 80 for detecting a rotational speed NC of the first counter gear G1, and the like. The electronic control unit 90 receives signals indicative of engine speed NE, the intake air amount Q, the intake air temperature $T_A$, the throttle valve opening $\theta_{TH}$, the vehicle speed V, the engine coolant temperature $T_W$, the brake operation state BK, the shift position $P_{SH}$ of the shift lever 72, the turbine speed NT, the AT oil temperature $T_{OIL}$, the counter rotational speed NC, and the like.

Figure 5:
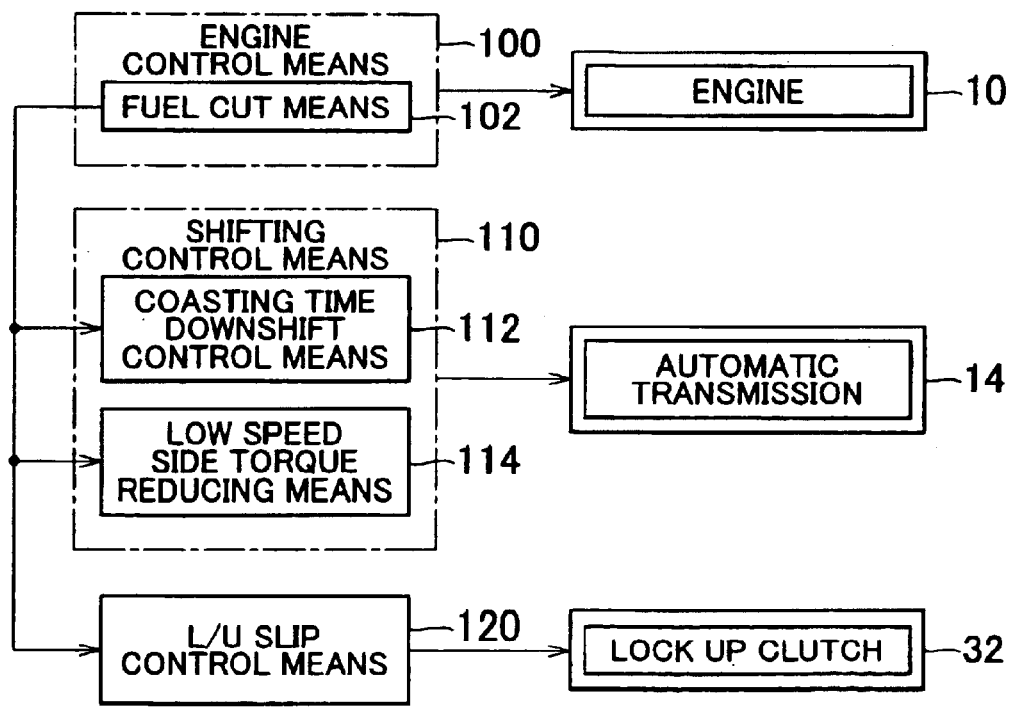
FIG. 5 is a block diagram showing main portions of an electronic control unit in FIG. 3.

The electronic control unit 90 is provided with a so-called microcomputer including a CPU, RAM, ROM, and an input/output interface and the like. The CPU performs signal processing according to a program stored in the ROM in advance while using a temporary storage function of the RAM so as to perform output control of the engine 10, shifting control of the transmission 14, slip control of the lockup clutch 32, and the like. The CPU for the engine control and the CPU for the transmission control are configured separately as required. FIG. 5 is a block diagram describing functions performed by the signal processing by the electronic control unit 90. Functionally, engine control means 100, shifting control means 110, and L/U (lockup) slip control means 120 are provided. The engine control means 100 further includes fuel cut means 102, and the shifting control means 110 further includes coasting time downshift control means 112, and low speed side torque reducing means 114.

Figure 6:
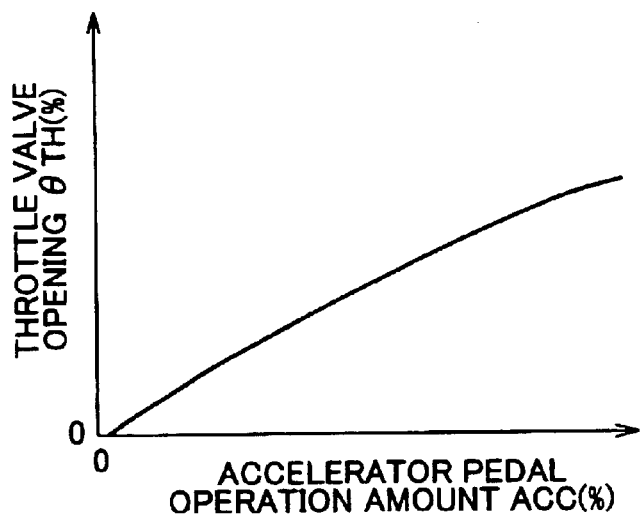
FIG. 6 is a graph showing a relationship between a throttle valve opening of an electronic throttle valve controlled by engine control means in FIG. 5, and an accelerator operation amount.

The engine control means 100 basically controls the output from the engine 10. In addition, the engine control means 100 controls opening/closing of the electronic throttle valve 56 using a throttle actuator 54, controls a fuel injector 92 so as to control a fuel injection amount, controls an ignition device 94 such as an ignitor so as to control ignition timing, and controls the ISC valve 53 so as to control the idle speed. In the control of the electronic throttle valve 56, the throttle actuator 54 is driven based on an actual accelerator pedal operation amount Acc, and the throttle valve opening $\theta_{TH}$ is increased with an increase in the accelerator pedal operation amount Acc, according to a relationship shown in FIG. 6.

The fuel cut means 102 stops fuel supply to the engine 10 so as to improve fuel economy when the vehicle is running forward with the throttle valve opening $\theta_{TH}$ being substantially 0, that is, when the vehicle is coasting forward. When a predetermined fuel cut start condition is satisfied, the fuel cut means 102 starts fuel cut for stopping fuel supply by the fuel injection valve 92. When a fuel cut cancellation condition is satisfied, the fuel cut means 102 cancels fuel cut and restarts fuel supply by the fuel injection valve 92, and starts the engine 10 promptly. The fuel cut cancellation condition includes a condition that the engine speed NE is lower than a fuel supply return speed $NE_{FC}$, a condition that the accelerator pedal 50 is depressed and the accelerator operation amount Acc is not substantially 0, and the like. The fuel supply return speed $NE_{FC}$ is a speed at which the engine 10 can operate by itself promptly due to the restart of fuel supply. The fuel supply return speed $NE_{FC}$ is set to a fixed value in advance, for example, in consideration of a change in an engine load due to the operation of auxiliaries, such as an air conditioner. However, for example, the fuel supply return speed $NE_{FC}$ may be set to be higher when the air conditioner is operated than when the air conditioner is not operated, using the engine load and the like as parameters. The fuel cut start condition may be a counter condition of the fuel cut cancellation condition. Alternatively, the fuel cut start condition may be a condition that the engine speed NE is equal to or higher than a speed which is higher than the fuel supply return speed $NE_{FC}$ by a predetermined amount or by a predetermined rate, a condition that the accelerator OFF state where the accelerator operation amount is substantially 0 has continued for a predetermined time or more, or the like, such that predetermined hysteresis is provided. Also, another condition such as a condition that the engine coolant temperature $T_W$ is equal to or higher than a predetermined value may be set as the start condition. The fuel cut start condition and the fuel cut cancellation condition can be regarded as the fuel cut condition.

Figure 7:
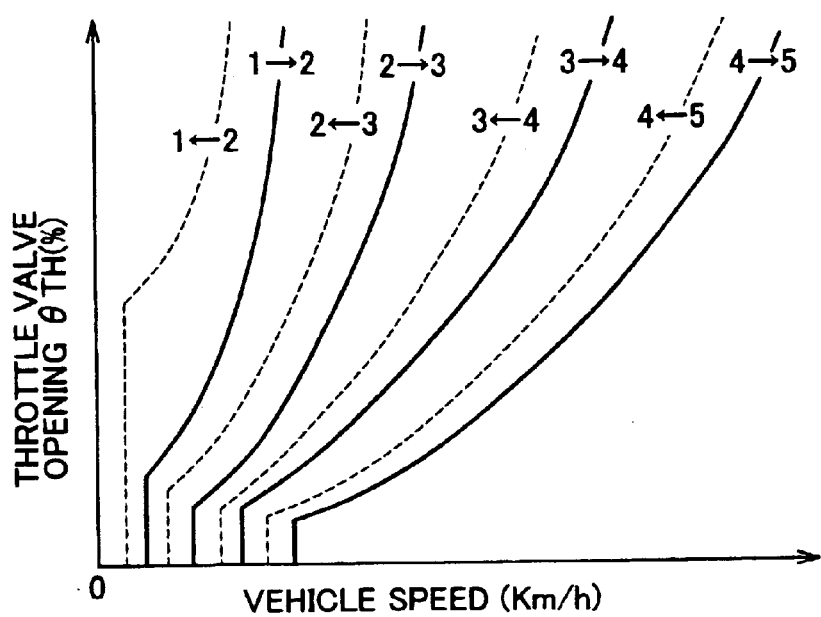
FIG. 7 is a graph showing an example of a shift map for automatically changing a shift speed of an automatic transmission by shifting control means in FIG. 5 according to an operation state.

The shifting control means 110 performs shifting control of the automatic transmission 14 according to the shift position $P_{SH}$ of the shift lever 72. For example, in the position "D", the shifting control is performed using all the forward shift speeds, which are first speed "1st" to fifth speed "5th". In the shifting control, the shift speed of the automatic transmission 14 is decided based on the actual throttle valve opening $\theta_{TH}$ and the vehicle speed V according to a pre-stored shift map (a shift condition) shown in FIG. 7. Then, states of the solenoids DSL, S4, SR of the hydraulic control circuit 98 are switched between ON (excitation) and OFF (nonexcitation) states, and the excitation states of the linear solenoids SL1, SL2, SL3, SLT are continuously changed by duty control or the like, such that the decided shift speed is achieved. The linear solenoid SL1 is configured to directly control the engagement hydraulic pressure of the brake B1, the linear solenoid SL2 is configured to directly control the engagement hydraulic pressure of the clutch C0, and the linear solenoid SL3 is configured to directly control the engagement hydraulic pressure of the clutch C1. The linear solenoids SL1, SL2, SL3 adjust and control the hydraulic pressures of the brake B1, the clutch C0 and the clutch C1 so that a shift shock such as a change in driving force does not occur, and durability of a friction member does not deteriorate. In FIG. 7, solid lines are lines indicative of upshifting, and dashed lines are lines indicative of downshifting. As the vehicle speed V decreases or the throttle valve opening $\theta_{TH}$ increases, the shift speed is changed to a low speed side shift speed, gear ratio of which (=input rotational speed $N_{IN}$/output rotational speed $N_{OUT}$) is large. The reference numerals "1" to "5" in the figure denote first shift speed "1st" to fifth shift speed "5th", respectively.

The L/U slip control means 120 feedback-controls the linear solenoid valve related to the pressure difference ΔP such that the lockup clutch 32 is engaged at a predetermined target slip amount SLP (for example, approximately −50 rpm) when the vehicle is coasting forward with the throttle valve opening $\theta_{TH}$ being substantially 0. The slip control is performed in a shift speed in which the reverse input from the drive wheel side is transmitted to the engine 10 side, that is, a shift speed in which engine brake can be applied. When the lockup clutch 32 is slip-engaged, the engine speed NE is increased to be close to the turbine speed NT. Accordingly, a fuel cut region (a vehicle speed region) in which fuel supply to the engine 10 is stopped expands, which improves fuel economy. The L/U slip control means 120 corresponds to the lockup engagement means. The lockup clutch 32 is fully engaged in a full engagement region, and is slip-engaged in a slip engagement region, which are set using the throttle valve opening $\theta_{TH}$, the vehicle speed V and the like as parameters.

The shifting control means 110 makes determination for downshifting according to the coasting-downshifting time vehicle speed, which is set independently of the shift map in FIG. 7, and performs downshifting of the automatic transmission 14 when the vehicle is coasting forward with the throttle valve opening $\theta_{TH}$ being substantially 0 and the lockup clutch 32 is slip-controlled by the L/U slip control means 120. The coasting-downshifting time vehicle speed is set for each shift speed according to the gear ratio of each forward shift speed such that fuel cut by the fuel cut means 102 is continued, that is, downshifting is performed before the engine speed NE reaches the fuel supply return speed $NE_{FC}$.

Figure 8:
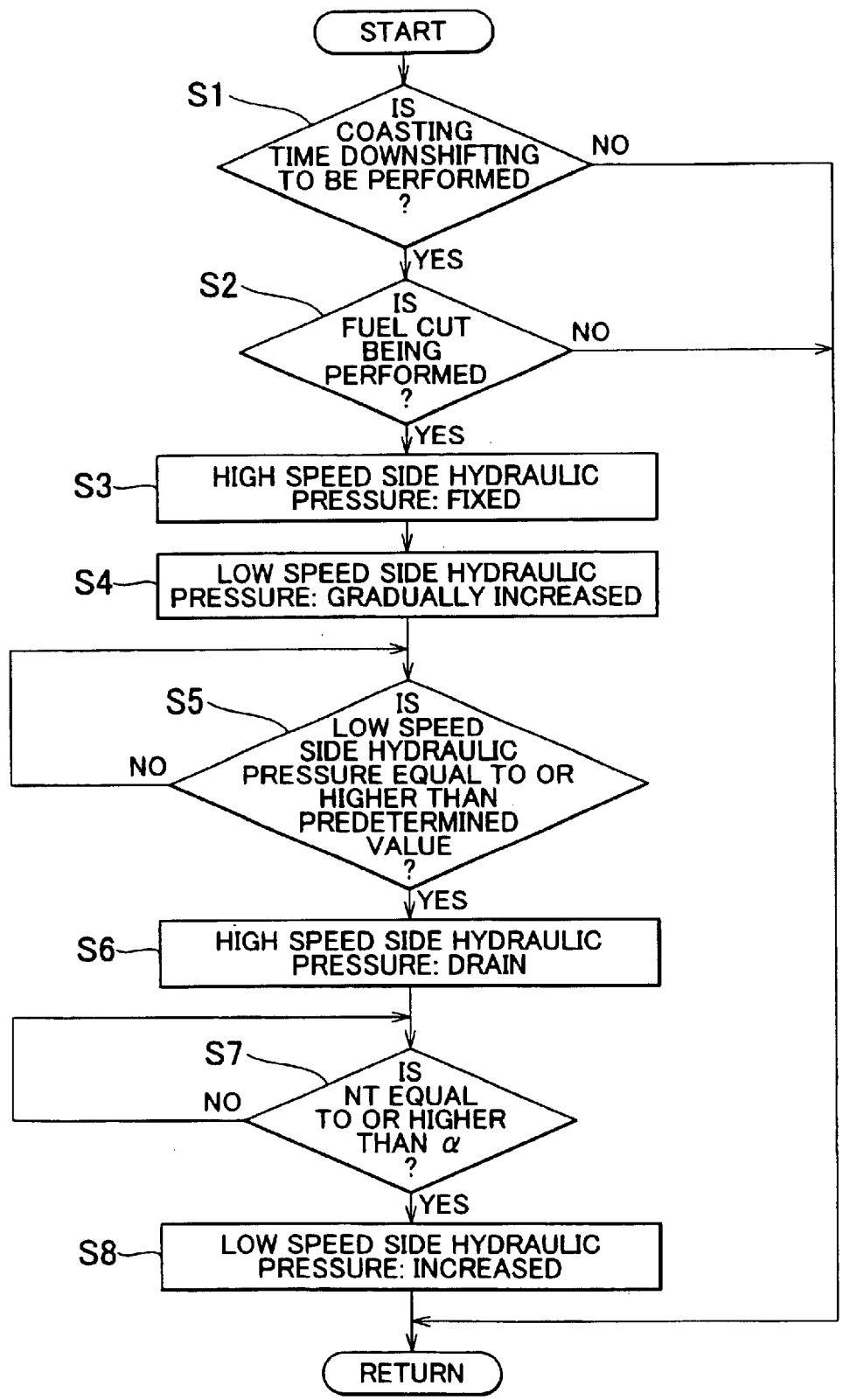
FIG. 8 is a flowchart specifically describing processes performed by coasting time downshift control means in FIG. 5.
Figure 10:
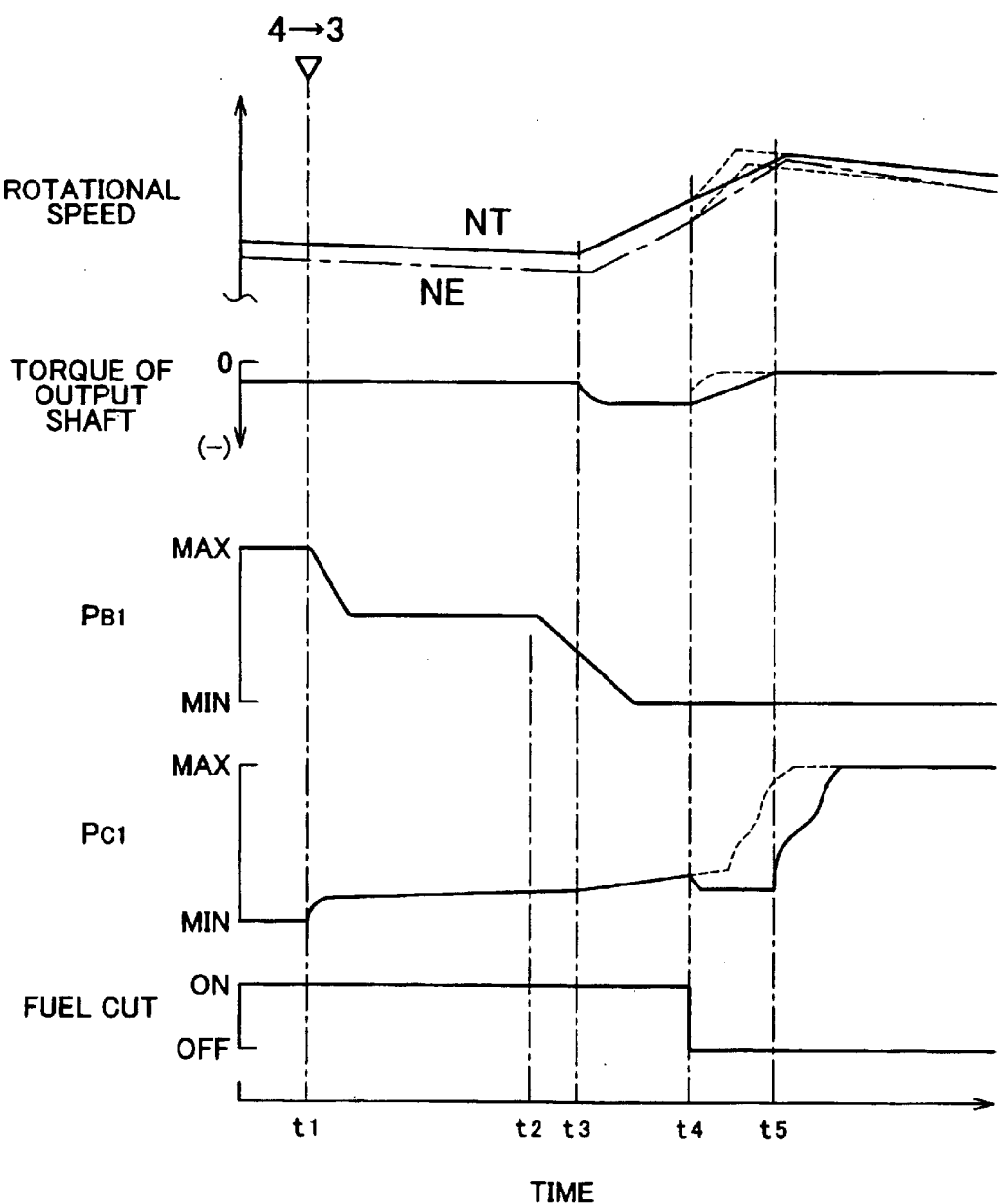
FIG. 10 is an example of a time chart describing changes in operation states of various portions when downshift control is performed according to the flowcharts in FIG. 8 and FIG. 9 during coasting time downshifting.

During coasting time downshifting, the coasting time downshift control means 112 performs hydraulic control for the disengagement side frictional engagement device, that is, the high speed side frictional engagement device and hydraulic control for the engagement side frictional engagement device, that is, the low speed side frictional engagement device, for example, according to a flowchart shown in FIG. 8. In step S1 in FIG. 8, it is determined whether or not coasting time downshifting is to be performed. In step S2, it is determined whether or not fuel cut is being performed by the fuel cut means 102, using a control execution flag or the like. When affirmative determinations are made in steps S1, S2, the hydraulic pressure of the high speed side frictional engagement device is maintained at a predetermined pressure in step 3, and the hydraulic pressure of the low speed side frictional engagement device is gradually increased by the linear solenoid valve or the like, from a hydraulic pressure value immediately before amount of torque is applied to the low speed frictional engagement device in step S4. The predetermined hydraulic pressure value in step 3, that is, the hydraulic pressure value of the high speed side frictional engagement device is a value at which a certain amount of torque that can prevent a decrease in the turbine speed NT, and further the engine speed NE due to the neutral state of the automatic transmission 14 can be obtained. For example, the hydraulic pressure value of the high speed side frictional engagement device is set to a fixed value for each downshifting type in advance. FIG. 10 is an example of a time chart describing changes in operation states of various portions when downshifting from fourth speed to third speed is performed at the coasting time. During the downshifting, the brake B1 as the high speed side frictional engagement device is disengaged, and the clutch C1 as the low speed side frictional engagement device is engaged. The hydraulic pressure value of the disengagement side brake B1 is denoted by $P_{B1}$, and the hydraulic pressure value of the engagement side clutch C1 is denoted by $P_{C1}$. A signal for downshifting from fourth speed to third speed is output at time $t_1$.

In step S5, it is determined whether or not the hydraulic pressure of the engagement side frictional engagement device, that is, the low speed side frictional engagement device has reached a predetermined value. The predetermined value is a hydraulic pressure value at which a certain amount of torque that prevents a decrease in the turbine speed NT even when the high speed side frictional engagement device is disengaged is applied to the low speed side frictional engagement device. For example, the predetermined value is set to a fixed value for each downshifting type in advance. When an affirmative determination is made in step S5, the hydraulic fluid for hydraulic pressure for the disengagement side frictional engagement device, that is, the high speed side frictional engagement device is drained promptly in step S6. In FIG. 10, the hydraulic pressure $P_{C1}$ of the engagement side clutch C1 is increased to a predetermined value, an affirmative determination is made in step S5, and the hydraulic fluid of the disengagement side brake B1 starts to be drained at time $t_2$. The inertia phase in which the turbine speed NT is increased due to disengagement of the brake B1 and an increase in the amount of torque of the clutch C1 starts at time $t_3$. At this time, the turbine speed NT and the engine speed NE are increased, whereby the engine brake force is increased due to inertia of various portions, and the torque of the output shaft (driving torque) is decreased. In order to suppress a sudden change in the torque at this time, the hydraulic pressure $P_{C1}$ of the low speed side frictional engagement device is increased gradually and slowly. In the embodiment, an increasing rate of the hydraulic pressure $P_{C1}$ becomes slightly high after the inertia phase starts.

In step S7, it is determined whether or not the turbine speed NT has been increased and has reached a predetermined value $\alpha$ at which downshifting is substantially finished. When the turbine speed NT becomes equal to or higher than the predetermined value $\alpha$, the engagement side hydraulic pressure is increased at a large changing rate, the low speed side frictional engagement device is completely engaged promptly, and a series of shifting control is finished in step S8. Step S7 is performed for determining whether or not downshift has progressed and the turbine speed NT has come close to a synchronous speed NT* after downshifting. The predetermined value $\alpha$ is set to a value that is substantially equal to the synchronous speed NT* or a value that is lower than the synchronous speed NT* by a predetermined value. The synchronous speed NT* can be determined based on the output rotational speed $N_{OUT}$ corresponding to the vehicle speed V, and the gear ratio of the shift speed after downshifting.

Thus, the coasting time downshift control means 112 drains the hydraulic fluid for the hydraulic pressure of the high speed side frictional engagement device after a predetermined amount of torque is applied to the engagement side frictional engagement device, that is, the low side frictional engagement device. Therefore, during coasting time downshifting, the automatic transmission 14 is brought into the neutral state, and the turbine speed NT and the engine speed NE are temporarily decreased. Accordingly, it is possible to prevent occurrence of a shift shock, and deterioration of fuel economy due to cancellation of fuel cut and restart of fuel supply. Also, since the hydraulic pressure of the low speed side frictional engagement device is gradually increased, the turbine speed NT, and further the engine speed NE is smoothly increased, and a sudden change in the driving torque (the engine brake) is suppressed.

Meanwhile, the engine 10 starts to operate by itself when fuel cut is cancelled, for example, due to an increase in the fuel supply return speed $NE_{FC}$ caused by operation of the air conditioner, and fuel supply by the fuel injection valve 92 is restarted during coasting time downshifting. Therefore, for example, as indicated by dashed lines in FIG. 10, a changing rate (an increasing rate) of the engine speed NE and the turbine speed NT is increased, and the torque of the output shaft (the engine brake) is suddenly decreased, which makes the driver feel uncomfortable. In FIG. 10, the fuel cut is cancelled at time $t_4$.

Figure 9:
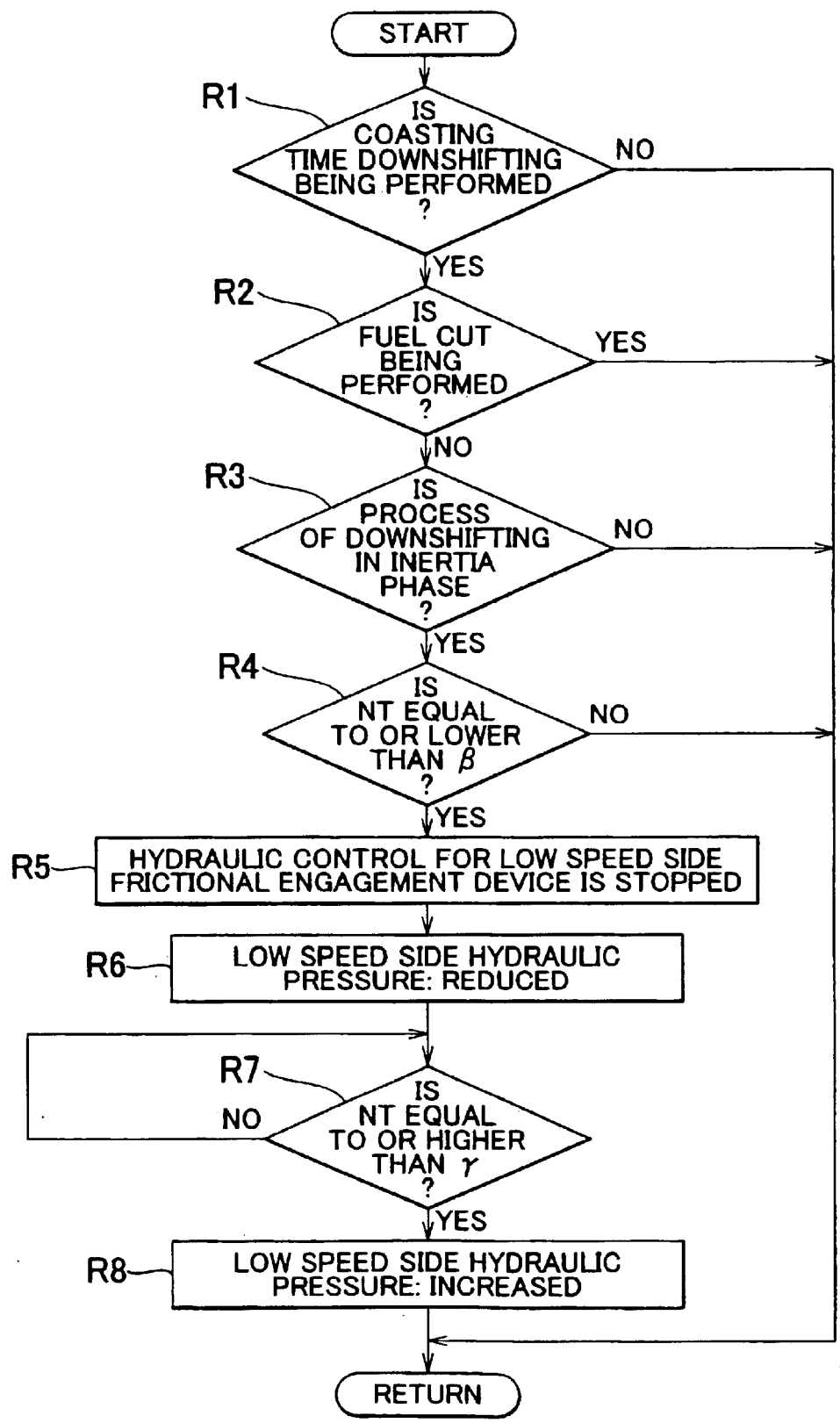
FIG. 9 is a flowchart specifically describing processes performed by low speed side torque reducing means in FIG. 5.

On the other hand, in the embodiment, the low speed side torque reducing means 114 is provided. Signal processing is performed according to a flow chart in FIG. 9 in parallel with signal processing performed by the coasting time downshift control means 112. In step R1 in FIG. 9, it is determined whether or not the coasting time downshift control is being performed, that is, whether or not the coasting time downshift control means 112 is performing steps S3 to S8 in FIG. 8, using the execution flag or the like. When the control is being performed, it is determined whether or not the fuel cut means 102 is performing fuel cut, using the execution flag or the like in step R2. When the fuel cut is being performed, the processing is finished. However, when the fuel cut is cancelled, step R3 and subsequent steps are performed.

In step R3, it is determined, based on a change in the turbine speed NT or the like, whether or not the process of coasting time downshifting performed by the coasting time downshift control means 112 is in the inertia phase, that is, the process of downshifting is at or after time $t_3$ at which the engine speed NE is increased due to the amount of torque of the low speed side frictional engagement device. Also, in step R4, it is determined whether or not downshifting has progressed to a level where the engine 10 races when the low speed side frictional engagement device is disengaged, based on whether or not the turbine speed NT is equal to or lower than a predetermined value $\beta$. For example, the predetermined value $\beta$ is set to a value that is lower than the synchronous speed NT* after downshifting by a predetermined value. When affirmative determinations are made in steps R3, R4, that is, when the process of downshifting is in the inertia phase and the progress degree of downshifting is equal to or lower than the predetermined value, step R5 and subsequent steps are performed so as to temporarily reduce the amount of torque of the low speed side frictional engagement device.

In step R5, hydraulic control of the engagement side frictional engagement device, that is, the low speed side frictional engagement device, which is performed by the coasting time downshift control means 112, is stopped. In step R6, the hydraulic pressure of the low speed side frictional engagement device is reduced to a hydraulic pressure value immediately before the amount of torque is applied to the low speed side frictional engagement device so that the amount of torque becomes 0. For example, the hydraulic pressure value is equal to the value when the hydraulic pressure starts to be gradually increased, and is set to a fixed value in advance. The hydraulic pressure value may be corrected by learning, for example, based on a change in the turbine speed NT during shifting as required. In FIG. 10, control for reducing the hydraulic pressure of the low speed side frictional engagement device is started in this manner at time $t_4$. At this time, the hydraulic pressure $P_{C1}$ of the low speed side clutch C1 is reduced due to cancellation of fuel cut, whereby the force for increasing the turbine speed NT and the engine speed NE is decreased. Therefore, as indicated by the solid lines, a change in the increasing rate of the engine speed NE and the turbine speed NT is suppressed though the engine 10 operates by itself, and a sudden change in the torque of the output shaft (the engine brake) is suppressed.

In step R7, it is determined whether or not the turbine speed NT has reached a predetermined value $\gamma$. When the turbine speed NT is equal to or higher than the predetermined value $\gamma$, the low speed side hydraulic pressure is increased at a large changing rate, and the low speed side frictional engagement device is completely engaged promptly in step R8, and coasting time downshifting is finished. Step R7 is for determining whether or not the turbine speed NT has come close to the synchronous speed NT* after downshifting. The predetermined value $\gamma$ is set to a value that is lower than the predetermined value in step S7 in order to prevent overshooting of the turbine speed NT since the engine 10 operates by itself. When an affirmative determination is made in step R7, the hydraulic pressure $P_{C1}$ of the low speed side clutch C1 is suddenly increased at $t_5$ in FIG. 10.

Thus, in the embodiment, in the case where a signal for downshifting of the transmission is output while fuel supply is stopped by the fuel cut means 102 at the coasting time, and the engine speed NE is being increased according to the control of torque of the low speed side frictional engagement device by the coasting time downshift control means 112, when the control by the fuel cut means 102 is cancelled and fuel supply is restarted, the amount of torque of the low speed side frictional engagement device is reduced by the low speed side torque reducing means 114, and torque transmitted from the engine 10 is reduced. Therefore, a change in the torque of the output shaft due to reoperation of the engine 10 is suppressed, and riding comfort is improved.

Also, in step R6, since the hydraulic pressure of the low speed side frictional engagement device is reduced to the hydraulic pressure value immediately before the amount of torque is applied to the low speed side frictional engagement device, engine torque is interrupted and an effect of the engine torque on the torque of the output shaft is completely prevented. In addition, when the low speed side frictional engagement device is engaged in step R8, the low speed side frictional engagement device can be engaged promptly. Therefore, the coasting time downshifting can be finished promptly while suppressing overshooting of the engine speed NE and the turbine speed NT.

Since the coasting time downshifting is automatically performed when the driver does not intend to change torque at the time of deceleration, there is a high possibility that the driver sensitively feels a change in the torque of the output shaft due to reoperation of the engine 10 even if the change in the torque is slight. In the aforementioned embodiment, the torque transmitted from the engine 10 is interrupted, whereby the uncomfortable feeling is reduced, and the riding comfort is improved.

The embodiment of the invention has been described with reference to the drawings. However, the embodiment is to be considered in all respects as illustrative and not restrictive, and the invention can be realized in embodiments in which various changes and modifications are made based on knowledge of persons skilled in the art.

What is claimed is:

1. A driving control apparatus for a vehicle, comprising an engine which generates power by fuel combustion;
   a transmission which achieves plural speeds, gear ratios of which are different from each other, by changing engagement/disengagement states of plural frictional engagement devices including a high speed side frictional engagement device and a low speed side frictional engagement device;
   a fuel cut control device which performs fuel cut in which fuel supply to the engine is stopped when a predetermined fuel cut condition including a condition that the vehicle is coasting is satisfied;
   a transmission control device which performs control for disengaging the high speed side frictional engagement device and applying an amount of torque to the low speed side frictional engagement device such that an engine speed is increased when downshifting of the transmission is automatically performed at a coasting time; and
   a low speed side torque control device which stops the control of torque of the low speed side frictional engagement device by the transmission control device so as to reduce the amount of torque of the low speed side frictional engagement device when the fuel cut by the fuel cut control device is cancelled and the fuel supply is restarted in a case where a signal for downshifting of the transmission is output while fuel supply is stopped by the fuel cut control device at the coasting time, and then the engine speed is being increased due to the control of torque of the low speed side frictional engagement device by the transmission control device.

2. The driving control apparatus according to claim 1, wherein the amount of torque is applied to the low speed side frictional engagement device by supplying a hydraulic pressure to a hydraulic actuator, and the low speed side torque control device reduces the hydraulic pressure to a hydraulic pressure value immediately before the amount of torque is applied to the low speed side frictional engagement device.

3. The driving control apparatus according to claim 2, wherein the low speed side torque control device reduces the hydraulic pressure of the low speed side frictional engagement device, and then causes the low speed side frictional engagement device to be completely engaged promptly when a rotational speed of an input shaft of the transmission becomes equal to or higher than a first predetermined value.

4. The driving control apparatus according to claim 1, wherein the amount of torque is applied to the low speed side frictional engagement device by supplying a hydraulic pressure to a hydraulic actuator, and the low speed side torque control device reduces the hydraulic pressure until the amount of torque of the low speed side frictional engagement device becomes equal to a predetermined amount of torque.

5. The driving control apparatus according to claim 4, wherein the low speed side torque control device reduces the hydraulic pressure of the low speed side frictional engagement device, and then causes the low speed side frictional engagement device to be completely engaged promptly when a rotational speed of an input shaft of the transmission becomes equal to or higher than a first predetermined value.

6. The driving control apparatus according to claim 1, wherein the low speed side torque control device causes the low speed side frictional engagement device to be completely engaged promptly when a rotational speed of an input shaft of the transmission becomes equal to or higher than a second predetermined value in a case where the fuel supply is not restarted.

7. A driving control method for a vehicle, comprising:
   determining whether fuel cut is being performed;
   determining whether a signal for downshifting has been output when the vehicle is coasting;
   performing coasting time downshift control for disengaging a high speed side engagement device of a transmission and applying an amount of torque to a low speed side engagement device such that an engine speed is increased, when the signal for downshifting has been output;
   determining whether the fuel cut has been cancelled in a case where the engine speed is being increased by the coasting time downshift control based on the signal for downshifting which is output when the fuel cut is being performed and the vehicle is coasting; and
   reducing the amount of torque of the low speed side frictional engagement device when it is determined that the fuel cut has been cancelled.

8. The driving control method according to claim 7, wherein hydraulic pressure of the low speed side frictional engagement device is reduced to a hydraulic pressure value immediately before the amount of torque is applied to the low speed side frictional engagement device when the fuel cut is cancelled in the case where the engine speed is being increased.

9. The driving control method according to claim 8, further comprising:
   causing the low speed side frictional engagement device to be completely engaged promptly when a rotational speed of an input shaft of the transmission is equal to or higher than a first predetermined value after the hydraulic pressure of the low speed side frictional engagement device is reduced.

10. The driving control method according to claim 7, wherein the hydraulic pressure of the low speed side frictional engagement device is reduced until the amount of torque of the low speed side frictional engagement device becomes equal to a predetermined amount of torque when the fuel cut is cancelled in the case where the engine speed is being increased.

11. The driving control method according to claim 10, further comprising:
   causing the low speed side frictional engagement device to be completely engaged promptly when a rotational speed of an input shaft of the transmission is equal to or higher than a first predetermined value after the hydraulic pressure of the low speed side frictional engagement device is reduced.

12. The driving method according to claim 7, further comprising:
   causing the low speed side frictional engagement device to be completely engaged promptly when a rotational speed of an input shaft of the transmission becomes equal to or higher than a second predetermined value in a case where the fuel supply is not restarted.

\* \* \* \* \*